United States Patent [19]

Christian

[11] Patent Number: 5,120,447
[45] Date of Patent: Jun. 9, 1992

[54] METHOD FOR REMOVING HEAVY METALS FROM WASTEWATER

[75] Inventor: Joel B. Christian, Towanda, Pa.

[73] Assignee: GTE Products Corporation, Stamford, Conn.

[21] Appl. No.: 665,619

[22] Filed: Mar. 6, 1991

[51] Int. Cl.$^5$ .............................. C02F 1/62; C02F 1/54
[52] U.S. Cl. ..................... 210/714; 210/912; 210/724; 210/725; 210/727; 210/717
[58] Field of Search ............... 210/714, 912, 717, 723, 210/724, 725, 713, 911, 913, 914, 726, 727, 915

[56] References Cited

U.S. PATENT DOCUMENTS

| | | |
|---|---|---|
| 3,855,125 | 12/1974 | Lin ........................................ 210/714 |
| 4,465,597 | 8/1984 | Herman et al. ....................... 210/713 |
| 4,563,285 | 1/1986 | Nair et al. ............................ 210/714 |
| 4,566,912 | 1/1986 | Borg ..................................... 210/912 |
| 4,618,429 | 10/1986 | Herrigel ............................... 210/714 |
| 5,013,452 | 5/1991 | Walker ................................. 210/912 |

Primary Examiner—Stanley S. Silverman
Assistant Examiner—Neil M. McCarthy
Attorney, Agent, or Firm—Elizabeth A. Levy

[57] ABSTRACT

A method for treating wastewater having a pH of between about 0.1 and 14 and containing dissolved heavy metals, in which a substantial portion of the heavy metals is precipitated as crystallized solids embedded within an insoluble monoclinic calcium sulfate crystal to produce a purified effluent having a pH of between 8 and 9.

16 Claims, 1 Drawing Sheet

METHOD FOR REMOVING HEAVY METALS FROM WASTEWATER

TECHNICAL FIELD

This invention relates to a process for treating wastewater containing dissolved heavy metals in which a substantial portion of the heavy metals is precipitated as crystallized solids to produce a purified effluent having a pH of between 8 and 9.

BACKGROUND OF THE INVENTION

The discharge into the environment of industrial wastewaters containing dissolved heavy metals is often prohibited for environmental, health and safety reasons. Wastewater contaminated with heavy metals could be toxic to aquatic life as well as unfit for human consumption.

U.S. Pat. No. 4,465,597 to Herman et al. discloses a method for removing dissolved heavy metals from an acidic industrial wastewater with a pH of between 2.5 and 5.0 by introducing a neutralizing agent adsorbed on the surface of a carrier which can be silica, sand, alumina, recycled metal oxides, recycled sludge formed in the method, or combinations thereof.

The Herman et al. method is limited to removing dissolved heavy metals from industrial wastewater having a pH between 2.5 and 5.0. This restriction results from the fact that certain heavy metals which precipitate at one pH level may redissolve upon further pH adjustments and, hence, recontaminate the resulting effluent since the solubility of various heavy metals varies with the pH of the solution in which they are dissolved.

Additionally, the prior art method uses a substantially instantaneous pH adjustment process, which is more likely to form amorphous insoluble calcium salts, as opposed to calcium salts in the monoclinic crystal form. The amorphous insoluble calcium salts tend to deposit on the surfaces of equipment, causing clogging and, hence, temporary shutdown of equipment operations for cleaning and maintenance.

SUMMARY OF THE INVENTION

It would be an advancement in the art to prevent the build-up of insoluble calcium salts, or scaling, on wastewater treatment equipment.

It would be a further advancement in the art to provide a method for reducing the tendency of precipitated heavy metal compounds to redissolve as the pH of the solution changes.

In accordance with this invention, there is provided a method for treating wastewater having a pH of between about 0.1 and 14 and containing dissolved heavy metals, comprising the steps of: mixing an aqueous solution containing at least 100 grams per liter of a calcium compound selected from the group consisting of calcium chloride and calcium hydroxide with monoclinic calcium sulfate crystals to form a seeding solution; combining the seeding solution and wastewater to form a wastewater solution in which additional crystals of monoclinic calcium sulfate are formed on the already existing calcium sulfate crystals; adding a reagent to the wastewater solution to gradually adjust the pH of the wastewater solution to a desired range in order to promote the formation and growth of additional monoclinic calcium sulfate crystals and simultaneously precipitate a substantial portion of the dissolved heavy metals as metal hydroxides, a substantial portion of which is embedded within the monoclinic calcium sulfate crystals to form crystallized solids; separating the liquid portion of the wastewater solution from the crystallized solids to obtain a purified effluent having a pH of between 8 and 9; filtering the purified effluent; discharging the purified effluent to the environment; and reusing a portion of the crystallized solids in the seeding solution of the initial step.

DETAILED DESCRIPTION OF THE INVENTION

Figure 1:
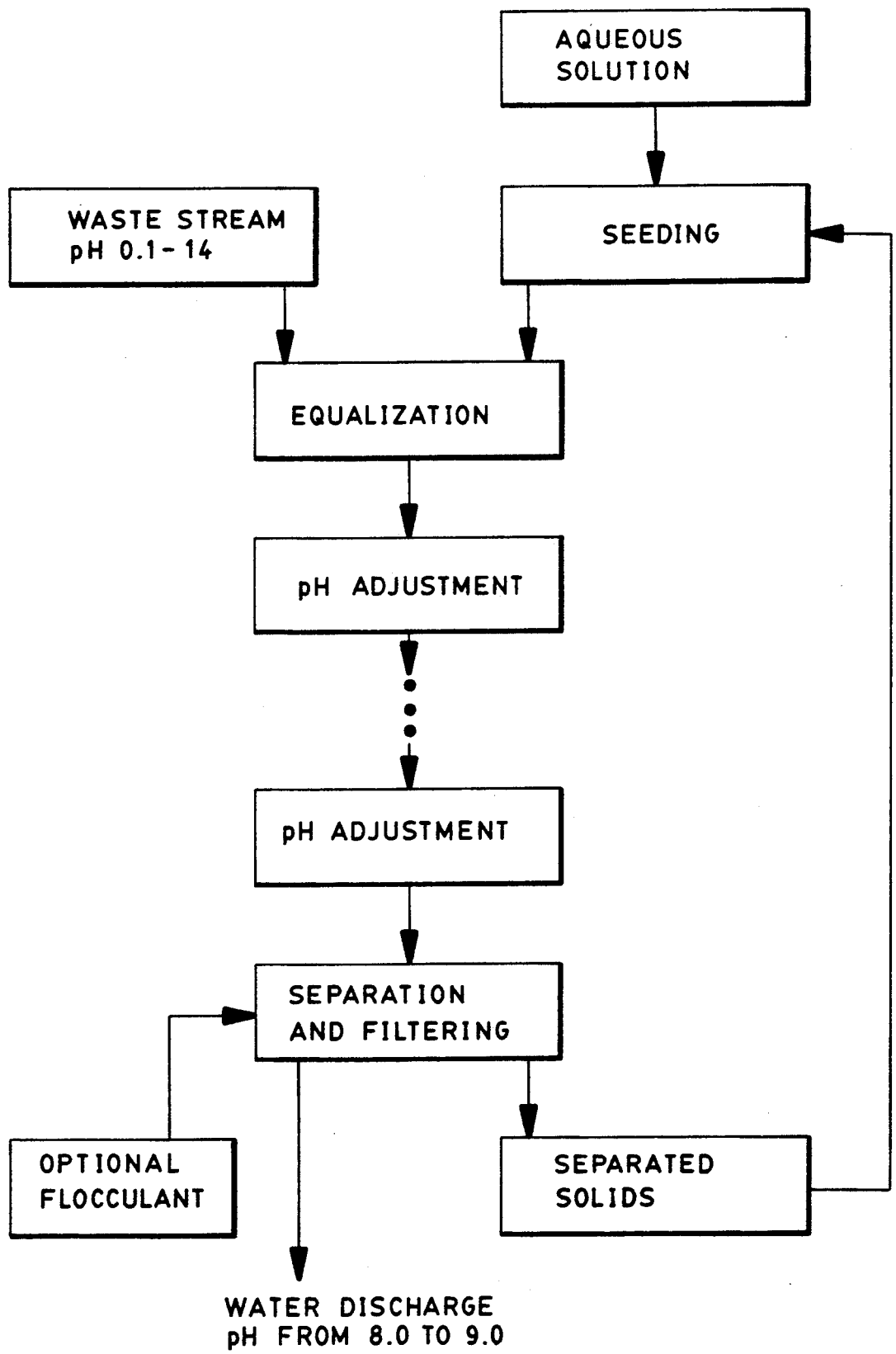
FIG. 1 is a flowchart showing the method of the invention.

For a better understanding of the present invention, together with other and further objects, advantages, and capabilities thereof, reference is made to the following disclosure and appended claims in connection with the above described drawing and description of some of the aspects of the invention.

For environmental and health reasons, it is often prohibited to discharge industrial wastewater containing dissolved concentrations of heavy metals. The present invention provides a method for removing a substantial portion of such dissolved metals while simultaneously adjusting the pH level of the wastewater solution to an environmentally acceptable range of between 8 and 9. The dissolved metals are precipitated as hydroxides which are embedded within an insoluble crystallized solid.

Industrial wastewater which may contain one or more heavy metals can be treated by the method of this invention. The term "heavy metals" refers to any element from groups IA through VIIA, IB through VIIB, and VIII of the periodic table. In particular, copper, nickel, lead, zinc, arsenic, tantalum, selenium, fluorine, molybdenum, cobalt, tungsten and cadmium may be found in various concentrations in industrial wastewater. Additionally, such wastewater may contain varying concentrations of acids and bases such as hydrochloric acid, phosphoric acid, sulfuric acid, nitric acid, sodium hydroxide, and calcium hydroxide. Sulfuric acid is often the predominant acid in a wastewater from a typical industrial process.

Referring to FIG. 1, an aqueous solution containing at least $8.3 \times 10^{-4}$ pounds per gallon (100 milligrams per liter) of calcium compound is mixed with a seeding solid comprising monoclinic calcium sulfate crystal to form a seeding solution. The calcium compound can be calcium chloride or calcium hydroxide (i.e. lime). The seeding solid is calcium sulfate in the gypsum form, which has a monoclinic crystal structure. Typically, industrial wastewater treatment processes produce insoluble calcium salts such as calcium sulfate in the amorphous form, which consists of a small, random precipitate. The monoclinic structure of gypsum, however, is one of six crystal systems in which metal ions may easily fit. Hence, the seeding solid acts as nucleating particles for precipitation of insoluble metal compounds, as well as a crystal surface for surface adsorption of insoluble calcium salts formed during the pH adjustment process. During the seeding step, the calcium compound substantially instantaneously coats the monoclinic calcium sulfate crystal. The seeding solid then acts as a vehicle to both initiate the precipitation of heavy metal compounds and incorporate the precipitated metal hydroxides and insoluble calcium salts into its structure.

The seeding solution and wastewater stream are then combined to form a wastewater solution in an equalization process. The equalization process allows numerous waste streams having widely varying pH levels to come to an equilibrium at some pH value, while also allowing generous reaction time for the surface ion exchange of the calcium ion's partner adsorbed on the seeding crystal.

For example, the following equation applies to the surface ion exchange reaction between sulfuric acid and calcium hydroxide, both common waste products:

$$H_2SO_4 + Ca(OH)_2 \rightarrow CaSO_4 + 2H_2O$$

During equalization, surface ion exchange between sulfuric acid from the wastewater stream and the adsorbed calcium hydroxide occurs, forming additional calcium sulfate in the monoclinic form on the already-existing monoclinic calcium sulfate crystals. Typically, the seeding solution and wastewater are agitated for a period of at least four hours.

A reagent is then added in a series of steps to the wastewater solution to gradually adjust the pH of the solution to a desired range which is typically between 8 and 9. The reagent can be an acid or a base. Suitable acids include, but are not limited to, hydrochloric acid and sulfuric acid. Suitable bases include, but are not limited to, calcium hydroxide, magnesium hydroxide and sodium hydroxide. The preferred acid is sulfuric acid, while the preferred base is calcium hydroxide.

The reagent is added gradually in two or more steps. Multiple, gradual, pH adjustments prevent the uncontrolled loss of already-formed calcium sulfate crystals, facilitate the surface ion exchange reaction of the calcium compound, and prevent uncontrolled formation of undesirable precipitates. It has been determined that by greatly decreasing the speed of the reaction by increasing the number of pH adjustment steps and slowing down the pH adjustment process, control over the growth of calcium sulfate crystals increases. However, a three-step pH adjustment is the preferred embodiment of the invention, for both practical and economical purposes.

The following general equation applies during the pH adjustment process, in which calcium hydroxide (lime) is used as the reagent:

$$M^{+N}X_n + Ca(OH)_2 \rightarrow M(OH)_n + CAX_N;$$

where M is a metal or a transition element with charge +N, and X may be any anion.

During the pH adjustment stage, a substantial portion of the dissolved heavy metals is precipitated as metal hydroxides on the existing calcium sulfate seeding crystal while, simultaneously, additional monoclinic calcium sulfate crystal growth occurs. As a result of these reactions, metal hydroxides are embedded in the calcium sulfate monoclinic crystal structure and are less likely to redissolve with further pH adjustments. The calcium sulfate crystal which is embedded with precipitated metal hydroxides prevents the metal from redissolving in the wastewater solution. This method of gradual pH adjustment is extremely useful for treating incoming wastewater having widely varying pH levels.

Upon completion of the final pH adjustment, the liquid portion of the wastewater solution is separated from the crystallized solids. Typically, the purified effluent has a pH of between 8 and 9, and preferably 8.5. In the preferred embodiment of the invention, separation is achieved in a reactor clarifier in which suspended solids are agitated. The suspended solids act as nucleating agents to accelerate the precipitation of the crystallized solids. In order to further accelerate the precipitation process, a flocculating agent can also be optionally added to the wastewater solution during the clarification step. The preferred flocculating agent is an anionic polymer, such as Betz Industrial's 1115 L.

The purified effluent is then filtered by conventional means. A sand filter, for example, may be used for the filtering process.

The purified effluent which has a pH of between 8 and 9 may then be discharged to the environment. A portion of the crystallized solids, typically about 5% by weight, may be reused as the solid in the seeding solution, while the remainder may be disposed of by conventional means.

To more fully illustrate this invention, the following nonlimiting examples are presented:

EXAMPLE I

One gallon of a wastewater containing approximately 5% by weight calcium chloride ($CaCl_2$) and 5% by weight calcium hydroxide, or lime, ($Ca(OH)_2$) and having a pH of from 0 to 8.5 is added to 1 pound of recycled solids, or seeding crystal, in a 1.5-gallon polypropylene container. The seeding crystal is comprised of monoclinic calcium sulfate crystal, heavy metal hydroxides and lime. The retention time in the first container is 5 minutes. The wastewater-solids mixture is then discharged into a second, 15-gallon polypropylene tank and combined with 10 gallons of untreated wastewater having sulfuric acid ($H_2SO_4$) as the predominant acid, a pH of from 0 to 8.5, and containing about 500 parts per million each of heavy metals copper, lead, zinc, and nickel. The resulting waste solution is agitated with a Fisher Scientific 14-509-1 Heavy-Duty stirrer for 30 minutes and has a pH of from 0 to 8.5.

Lime ($Ca(OH)_2$), obtainable from Center Lime and Stone Co., Pleasant Gap, PA 16823, is then added to neutralize the waste solution in a three-step pH adjustment process. The total amount of lime needed to adjust the pH level to 8.5 is divided among three separate 1-gallon polypropylene neutralization tanks. The waste solution is transported by gravity feed to the first neutralization tank and lime is added until the pH is increased by ½ unit. During each neutralization step, a Fisher Scientific 14-509-1 Heavy-Duty stirrer is used to agitate the waste solution. The waste solution is then transported by gravity feed to the second neutralization tank and lime is added until the pH is increased by 1 unit or to 8.5, whichever is less. Finally, the waste solution is transported by gravity feed to the third neutralization tank to which lime is added until the solution pH is 8.5. At the final pH, a substantial portion, if not all, of the heavy metals will be precipitated as hydroxides. Additionally, any insoluble calcium compounds will tend to precipitate on the surfaces of the calcium sulfate seeding crystals.

The waste solution is then transferred to a flocculator type reactor clarifier, which has a large mixing impeller in the inlet well to promote flocculation in which fine particles which have precipitated agglomerate to form small masses. 1.5 parts per million of Betz Laboratories'

1115L anionic polymeric flocculant is added to the waste solution to accelerate the settling of the solid precipitates. The remaining liquid has a pH of 8.5 and is decanted off. Five percent by weight of the precipitated solids, consisting of a crystallized compound of calcium sulfate and embedded heavy metal hydroxides, is then recycled and added to the initial seeding tank as seeding crystals for the next process batch.

EXAMPLE II

One gallon of a wastewater containing approximately 5% by weight calcium chloride ($CaCl_2$) and 5% by weight calcium hydroxide, or lime, ($Ca(OH)_2$) and having a pH of from 8.5 to 14 is added to 1 pound of recycled solids, or seeding crystal in a 1.5-gallon polypropylene container. The seeding crystal is comprised of monoclinic calcium sulfate crystal, heavy metal hydroxides and lime. The retention time in the first container is 5 minutes. The wastewater-solids mixture is then discharged into a second, 15-gallon polypropylene tank and combined with 10 gallons of untreated wastewater having lime ($Ca(OH)_2$) as the predominant hydroxide, a pH of from 8.5 to 14 and containing about 500 parts per million each of heavy metals copper, lead, zinc, and nickel. The resulting waste solution is agitated with a Fisher Scientific 14-509-1 Heavy-Duty stirrer for 30 minutes and has a pH of from 8.5 to 14.

Sulfuric acid ($H_2SO_4$) is then added to neutralize the waste solution in a three-step pH adjustment process. The waste solution is transported by gravity feed to the first neutralization tank and sulfuric acid is added until the pH is decreased by ½ unit. During each neutralization step, a Fisher Scientific 14-509-1 Heavy-Duty stirrer is used to agitate the waste solution. The waste solution is then transported by gravity feed to the second neutralization tank and sulfuric acid is added until the pH is decreased by 1 unit or to 8.5, whichever is greater. Finally, the waste solution is transported by gravity feed to the third neutralization tank to which sulfuric acid is added until the solution pH is 8.5. At the final pH, a substantial portion, if not all, of the heavy metals will be precipitated as hydroxides. Additionally, any insoluble calcium compounds will tend to precipitate on the surfaces of the calcium sulfate seeding crystals.

The waste solution is then transferred to a flocculator type reactor clarifier, which has a large mixing impeller in the inlet well to promote flocculation in which fine particles which have precipitated agglomerate to form small masses. 1.5 parts per million of Betz Laboratories' 1115L anionic polymeric flocculant is added to the waste solution to accelerate the settling of the solid precipitates. The remaining liquid has a pH of 8.5 and is decanted off. Five percent by weight of the precipitated solids, consisting of a crystallized compound of calcium sulfate and embedded heavy metal hydroxides, is then recycled and added to the initial seeding tank as seeding crystals for the next process batch. While there has been shown and described what are at present considered the preferred embodiments of the invention, it will be obvious to those skilled in the art that various changes and modifications may be made therein without departing from the scope of the invention as defined by the appended claims.

What is claimed is:

1. A method for treating wastewater having a pH of between about 0.1 and 14 and containing dissolved heavy metals, said method comprising the steps of:

a) mixing an aqueous solution containing at least 100 gram per liter of a calcium compound selected from the group consisting of calcium chloride and calcium hydroxide with monoclinic calcium sulfate crystals to form a seeding solutio;
b) combining said seeding solution and said wastewater to form a wastewater solution in which additional crystals of monoclinic calcium sulfate are formed on said monoclinic calcium sulfate crystals;
c) adding a reagent to said wastewater solution to gradually adjust the pH of said wastewater solution to a desired range in order to promote the formation and growth of additional monoclinic calcium sulfate crystals and simultaneously precipitate a majority of said dissolved heavy metals as metal hydroxides, said majority of said metal hydroxides being embedded in said monoclinic calcium sulfate crystals to form crystallized solids, said embedded metal hydroxides thereby being prevented from redissolving into said wastewater solution;
d) separating the liquid portion of said wastewater solution from said crystallized solids to obtain a purified effluent having a pH of between 8 and 9;
e) filtering said purified effluent to produce a filtered purified effluent;
f) discharging said filtered purified effluent to the environment; and
g) reusing a portion of said crystallized solids in said seeding solution in step (a).

2. The method of claim 1 wherein said heavy metals are selected from the group consisting of elements from groups TA through VTTA, TR through VTTB, and VTTT of the periodic table.

3. The method of claim 2 wherein said heavy metals are selected from the group consisting of copper, nickel, lead, zinc, arsenic, tantalum, selenium, molybdenum, cobalt, tungsten and cadmium.

4. The method of claim 1 wherein said wastewater contains at least one member selected from the group consisting of hydrochloric acid, phosphoric acid, sulfuric acid, nitric acid, sodium hydroxide and calcium hydroxide.

5. The method of claim 1 wherein said reagent is selected from the group consisting of hydrochloric acid, sulfuric acid, calcium hydroxide, magnesium hydroxide and sodium hydroxide.

6. The method of claim 5 wherein said reagent is calcium hydroxide.

7. The method of claim 5 wherein said reagent is sulfuric acid.

8. The method of claim 1 wherein said reagent is added to said wastewater in at least two steps.

9. The method of claim 1 wherein said reagent is added to said wastewater in three steps.

10. The method of claim 1 wherein the pH of said wastewater solution is adjusted to between 8 and 9.

11. The method of claim 1 wherein said liquid portion of said wastewater solution is separated from said crystallized solids by clarifying means in which suspended solids are agitated and act as nucleating agents to accelerate the precipitation of said crystallized solids.

12. The method of claim 11 wherein said clarifying means is a reactor clarifier.

13. The method of claim 1 wherein said purified effluent has a pH of 8.5.

14. The method of claim 1 wherein a flocculating agent is optionally added to said wastewater solution during said separating step to accelerate the precipitation of said crystallized solids.

15. The method of claim 14 wherein said flocculating agent is an anionic polymer.

16. The method of claim 1 wherein said seeding solution and said wastewater are agitated for a period of at least four hours to allow the formation and growth of said monoclinic calcium sulfate crystals to occur.

* * * * *